(12) United States Patent
Karremans et al.

(10) Patent No.: US 8,696,015 B2
(45) Date of Patent: Apr. 15, 2014

(54) STROLLER

(75) Inventors: Taco Karremans, Overpelt (BE); Mark Schrooten, Antwerp (BE); Benoit Philippe Mintiens, Lint (BE)

(73) Assignee: Cosco Management, Inc., Wilmington, DE (US)

(*) Notice: Subject to any disclaimer, the term of this patent is extended or adjusted under 35 U.S.C. 154(b) by 434 days.

(21) Appl. No.: 13/042,299

(22) Filed: Mar. 7, 2011

(65) Prior Publication Data
US 2011/0221169 A1    Sep. 15, 2011

(30) Foreign Application Priority Data

Mar. 9, 2010 (NL) ................................ 2004371

(51) Int. Cl.
*B62B 7/10* (2006.01)
(52) U.S. Cl.
USPC ............................................ 280/642; 280/647
(58) Field of Classification Search
USPC .................................. 280/642, 42, 647, 650
See application file for complete search history.

(56) References Cited

U.S. PATENT DOCUMENTS

| | | | | |
|---|---|---|---|---|
| 2,986,400 | A | | 5/1961 | Phillips |
| 4,191,397 | A | * | 3/1980 | Kassai ........................... 280/647 |
| 4,216,974 | A | * | 8/1980 | Kassai ............................. 280/42 |
| 4,294,464 | A | | 10/1981 | Ettridge |
| 4,428,598 | A | * | 1/1984 | Kassai ........................... 280/644 |
| 4,544,178 | A | * | 10/1985 | Al-Sheikh et al. ............. 280/642 |
| 4,545,599 | A | * | 10/1985 | Kassai ........................... 280/642 |
| 5,257,799 | A | | 11/1993 | Cone et al. |
| 5,370,572 | A | * | 12/1994 | Lee ................................. 446/462 |
| 5,622,376 | A | * | 4/1997 | Shamie .......................... 280/642 |
| 5,755,455 | A | * | 5/1998 | Chen et al. .................... 280/642 |
| 5,845,925 | A | * | 12/1998 | Huang ............................ 280/642 |
| 6,095,548 | A | * | 8/2000 | Baechler ........................ 280/650 |
| 6,102,431 | A | * | 8/2000 | Sutherland et al. ............ 280/642 |
| 6,105,998 | A | | 8/2000 | Baechler et al. |
| 6,220,621 | B1 | * | 4/2001 | Newton .......................... 280/650 |
| 6,869,096 | B2 | | 3/2005 | Allen et al. |
| 6,991,248 | B2 | | 1/2006 | Valdez et al. |
| 7,077,420 | B1 | * | 7/2006 | Santoski ......................... 280/642 |
| 7,077,423 | B2 | * | 7/2006 | Hutchinson ................... 280/649 |
| 7,185,909 | B2 | | 3/2007 | Espenshade et al. |
| 7,237,795 | B2 | * | 7/2007 | Wu ................................ 280/651 |
| 7,296,820 | B2 | | 11/2007 | Valdez et al. |
| 7,396,039 | B2 | | 7/2008 | Valdez et al. |

(Continued)

FOREIGN PATENT DOCUMENTS

| | | |
|---|---|---|
| EP | 0090668 | 5/1983 |
| EP | 066332 | 7/1995 |

(Continued)

OTHER PUBLICATIONS

Annex to European Search Report dated Apr. 11, 2011, relating to European Application EP11157355.

(Continued)

*Primary Examiner* — Jeffrey J Restifo
(74) *Attorney, Agent, or Firm* — Barnes & Thornburg LLP

(57) ABSTRACT

A juvenile stroller includes a foldable frame, wheels coupled to the foldable frame, and a seat coupled to the foldable frame. The frame can be folded to assume a compact size and unfolded to position the seat relative to the wheels to transport a child sitting in the juvenile seat.

26 Claims, 11 Drawing Sheets

(56) References Cited

U.S. PATENT DOCUMENTS

| | | | |
|---|---|---|---|
| 7,632,035 B2 | 12/2009 | Cheng | |
| 7,798,500 B2 | 9/2010 | Den Boer | |
| 7,798,515 B2 * | 9/2010 | Valdez et al. | 280/647 |
| 8,083,240 B2 * | 12/2011 | Jacobs et al. | 280/47.38 |
| 8,087,689 B2 * | 1/2012 | Fritz et al. | 280/647 |
| 8,186,706 B2 * | 5/2012 | Dotsey | 280/647 |
| 8,205,907 B2 * | 6/2012 | Chicca | 280/642 |
| 8,240,698 B2 * | 8/2012 | Tsai | 280/647 |
| 8,322,744 B2 * | 12/2012 | Ahnert et al. | 280/642 |
| 8,485,547 B2 * | 7/2013 | Hsu | 280/647 |
| 8,517,412 B2 * | 8/2013 | Tsai et al. | 280/647 |
| 2006/0038378 A1 | 2/2006 | Lee | |
| 2006/0082104 A1 | 4/2006 | Wu | |
| 2007/0063487 A1 | 3/2007 | Wu | |
| 2007/0075525 A1 | 4/2007 | Nolan et al. | |
| 2007/0096434 A1 | 5/2007 | Haeggberg | |
| 2009/0121454 A1 * | 5/2009 | Tomasi et al. | 280/642 |
| 2011/0221169 A1 * | 9/2011 | Karremans et al. | 280/647 |
| 2012/0049485 A1 * | 3/2012 | Lin | 280/647 |
| 2012/0187660 A1 * | 7/2012 | Liao | 280/642 |
| 2012/0235385 A1 * | 9/2012 | Simpson et al. | 280/647 |
| 2013/0181428 A1 * | 7/2013 | Bost, Bart | 280/647 |

FOREIGN PATENT DOCUMENTS

| | | |
|---|---|---|
| EP | 1647463 | 4/2006 |
| EP | 1967439 | 10/2008 |
| FR | 2394434 | 12/1979 |
| WO | 2008145523 | 12/2008 |

OTHER PUBLICATIONS

International Search Report dated Feb. 12, 2009, for International Application No. PCT/US08/86415.

International Preliminary Report on Patentability (Chapter II) completed by the US Examining Authority on Oct. 9, 2010, for International Application No. PCT/US08/86415.

International Search Report dated Sep. 13, 2010, for Netherlands Application No. 2004371.

* cited by examiner

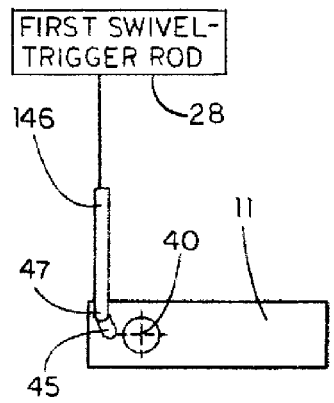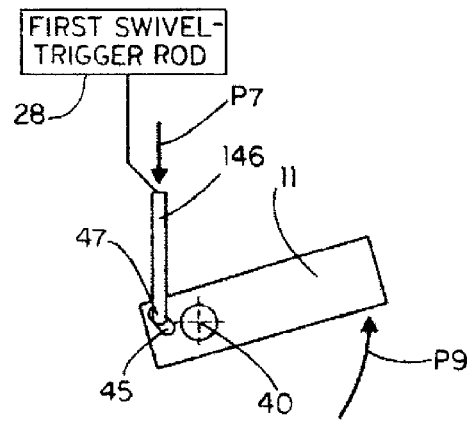
FIG. 7A  FIG. 7B
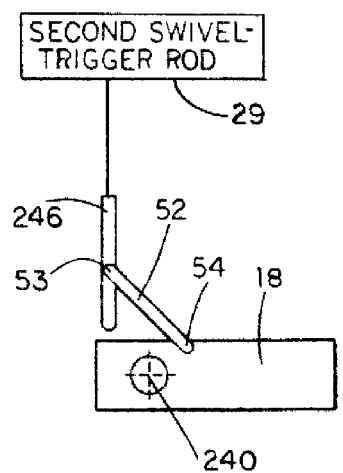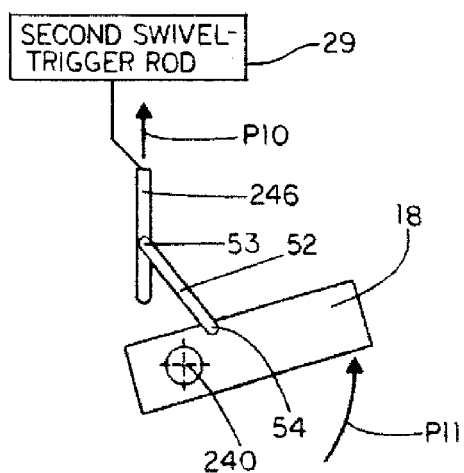
FIG. 8A  FIG. 8B

STROLLER

PRIORITY CLAIM

This application claims priority to Netherlands Application No. 2004371, filed Mar. 9, 2010, which application is hereby incorporated in its entirety herein.

BACKGROUND

The present disclosure relates to a stroller for transporting young children, and in particular to a stroller including a seat and a foldable frame coupled to the seat. More particularly, the present disclosure relates to stroller frames that fold to assume a compact size.

SUMMARY

A stroller in accordance with the present disclosure includes a foldable frame, wheels coupled to the foldable frame, and a seat coupled to the foldable frame. The foldable frame includes at least one front leg, at least one rear leg mounted for pivotable movement relative to the front leg, and at least one push arm mounted for pivotable movement relative to the front leg.

In illustrative embodiments, the foldable frame includes an arm gear coupled to the push arm and mounted to rotate about an arm pivot axis associated with the front leg during pivoting movement of the push arm relative to the front leg about that arm pivot axis. The foldable frame also includes a rear-leg gear coupled to the rear leg and mounted to rotate about a rear-leg pivot axis also associated with the front leg and to mesh with the arm gear to establish a pivot-control system. In operation, owing to the meshing of the arm and rear-leg gears, pivoting movement of the push arm about the arm pivot axis relative to the front leg causes pivoting movement of the rear leg about the rear-leg axis relative to the front leg. Pivoting movement of the push arm toward the front leg causes the rear leg to pivot toward the front leg to establish a collapsed storage configuration of the stroller. In contrast, pivoting movement of the push arm away from the front leg causes the rear leg to pivot away from the front leg to establish an expanded use configuration of the stroller.

In illustrative embodiments, the foldable frame of the stroller includes first and second side-frame assemblies. Each side-frame assembly includes a front leg, a rear leg, and a push arm. Each side-frame assembly also includes a foot part coupled for swiveling movement to a lower end of the companion front leg, an outer stretcher part coupled for swiveling movement to a lower end of the companion rear leg, and a handle part coupled for swiveling movement to an upper end of the companion push arm. To enhance compact folding of the foldable frame, the two foot parts are pivotably coupled to one another, the two handle parts are pivotably coupled to one another, and each of the two outer stretcher parts is pivotably coupled to a middle stretcher part interposed between the two outer stretcher parts.

In illustrative embodiments, the stroller also includes a swivel-control system configured to provide means for swiveling each of the foot parts, outer stretcher parts, and handle parts about companion swivel axes relative to companion front legs, rear legs, and push arms to cause the first side-frame assembly and the second side-frame assembly to move relative to one another to a drawn-together position in which the side-frame assemblies are located closer to one another to a spread-apart position in which the side-frame assemblies are located farther apart from one another in response to pivoting movement of the push arms relative to the front and rear legs. In an illustrative embodiment, the swivel-control system comprises a first operating element associated with each of the front legs in the side-frame assemblies, a second operating element associated with each of the rear legs in the side-frame assemblies, and a third operating element associated with each of the push arms in the side-frame assemblies. Three curved swivel-trigger rods and three extension elements are included in swivel-control system and cooperate to provide means for swiveling the swivelable parts of the front leg, the rear leg, and the push arm, respectively.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 7A and 7B are schematic front views of the first embodiment as shown in FIGS. 6A and 6B, respectively, FIGS. 8A and 8B are schematic front views of a second embodiment of two pivotably interconnected parts in an unfolded position and a folded position of the stroller, respectively, and FIG. 9 us a schematic view of a third embodiment of pivotably interconnected parts in an unfolded position.

DETAILED DESCRIPTION

Figure 1:
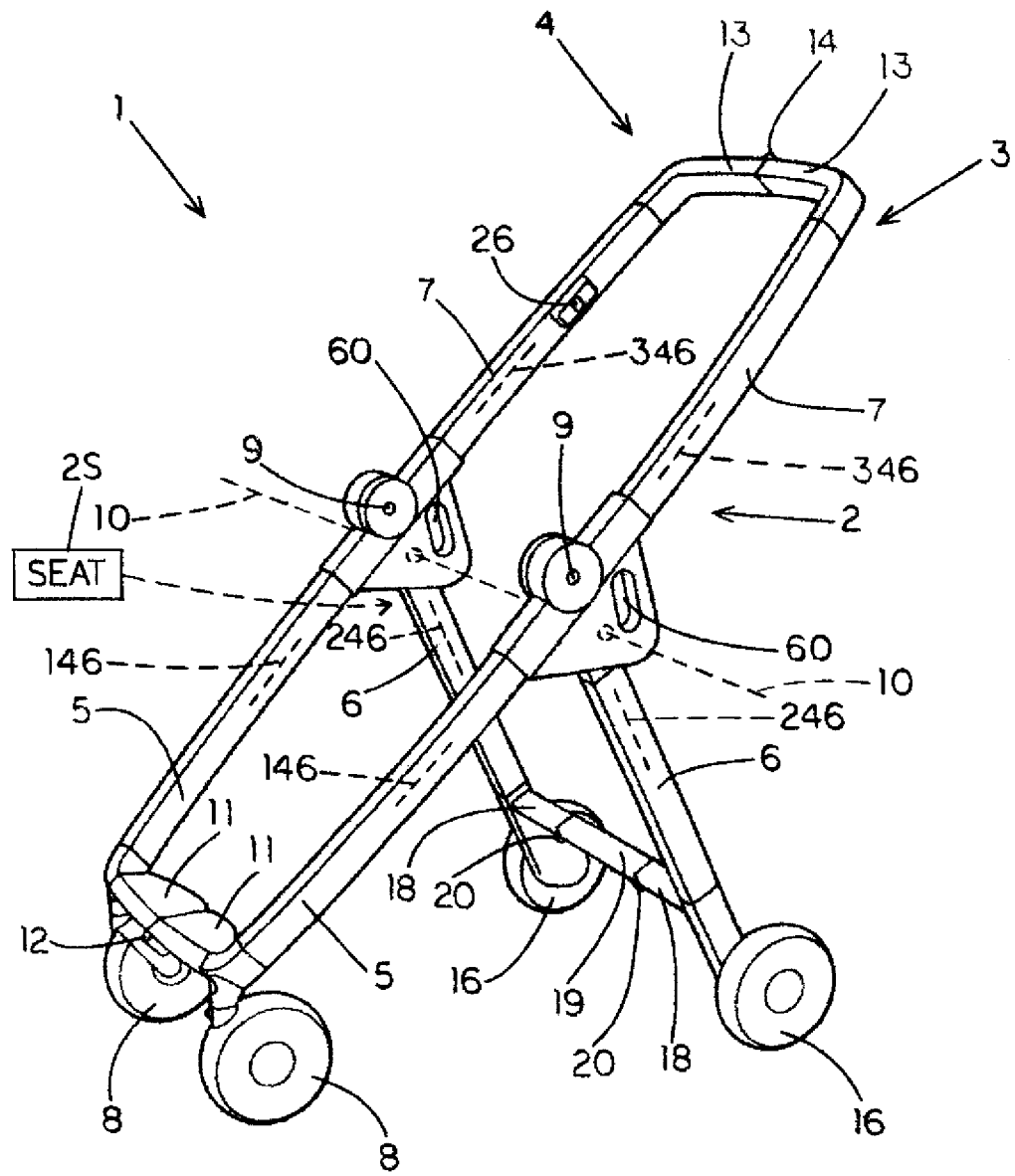
FIG. 1 is a perspective view of a stroller according to the present disclosure, with the stroller in an unfolded position.
Figure 2:
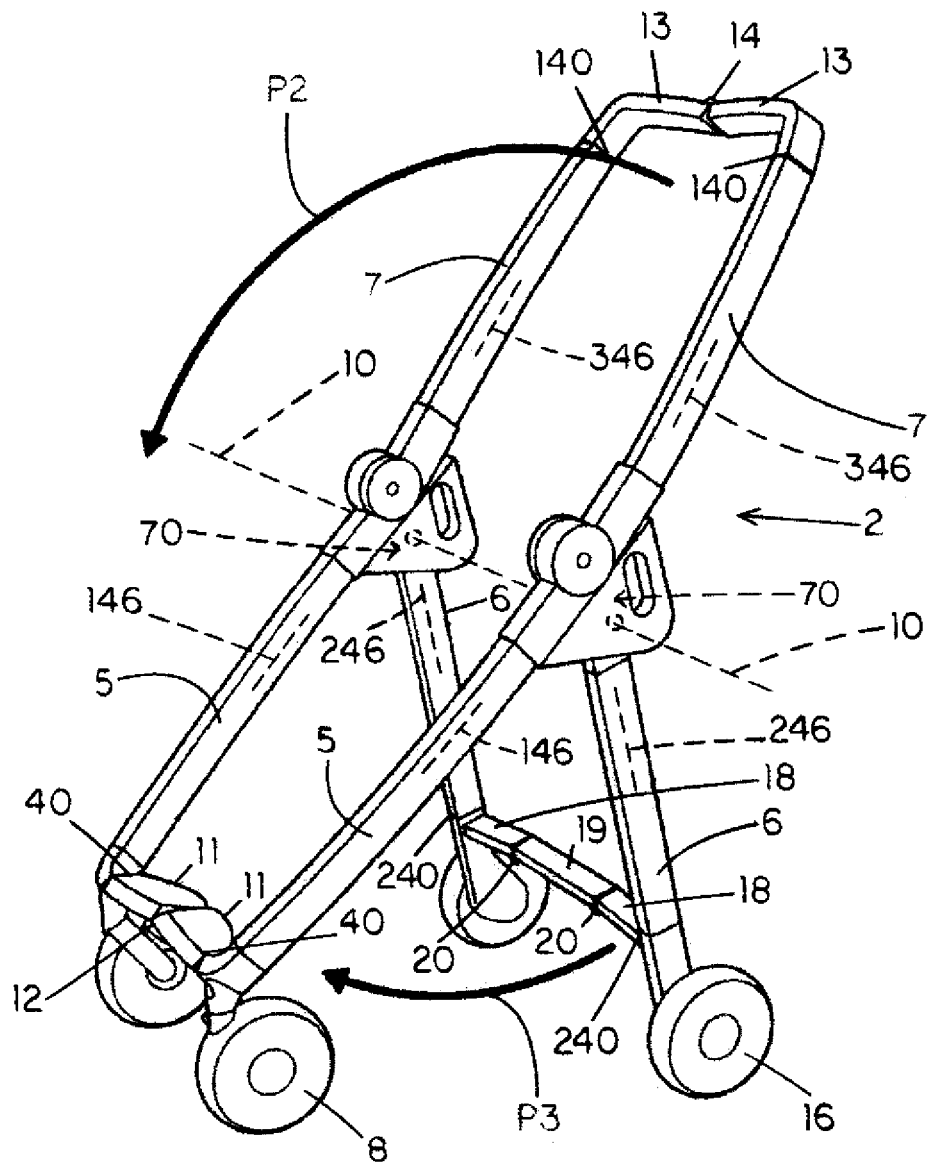
FIG. 2 is a perspective view of a stroller as shown in FIG. 1 according to the present disclosure, with the stroller in a partly folded position.
Figure 3:
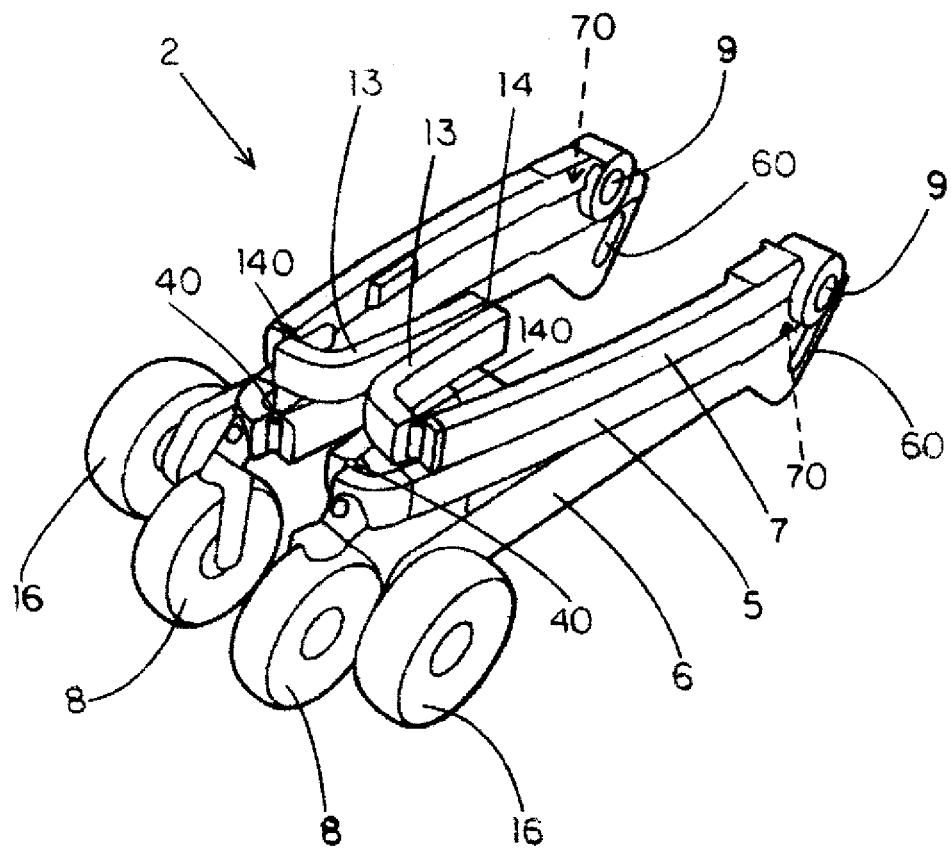
FIG. 3 is a perspective view of a stroller as shown in FIG. 1 according to the present disclosure, with the stroller in a folded position.

FIGS. 1, 2, and 3 show perspective views of a stroller 1 according to the disclosure in an unfolded position, a partly folded position, and a folded position, respectively. Stroller 1 is provided with a foldable frame 2 and a seat 2S configured to be detachably connected to frame 2 as suggested in FIG. 1. Frame 2 is provided with a first side-frame assembly 3 and a second side-frame assembly 4. Each side-frame assembly 3, 4 is provided with a first (front) leg 5, a second (rear) leg 6, and a push arm 7. Legs 5, 6, and push arms 7 are illustratively made of hollow tubes of metal or plastic.

A pivot-control system 70 is coupled to push arm 7 and first and second legs 5, 6 of each of first and second side-frame assemblies 3, 4 of foldable frame 2 as suggested in FIG. 1. Each pivot-control system 70 is configured and mounted to provide means for moving a second leg 6 relative to companion first legs 5 to cause companion first and second legs 5, 6 to move relative to one another between expanded use positions shown, for example, in FIG. 1 and retracted storage positions shown, for example, in FIG. 4 in response to movement of companion push arms 7 relative to companion first and second legs 5, 6 as suggested in FIGS. 2 and 5A. In illustrative embodiments, each pivot-control system 70 comprises a first (arm) gear part 15 coupled to the push arm 7 and mounted for pivotable movement about a first (arm) pivot axis 9 associated with companion first leg 5 and a second (rear-leg) gear part 17 coupled to the second leg 6 to mesh with first (arm) gear part 15 and mounted for pivotable movement about a second (rear-leg) pivot axis 10 associated with companion first leg 5.

Figure 4:
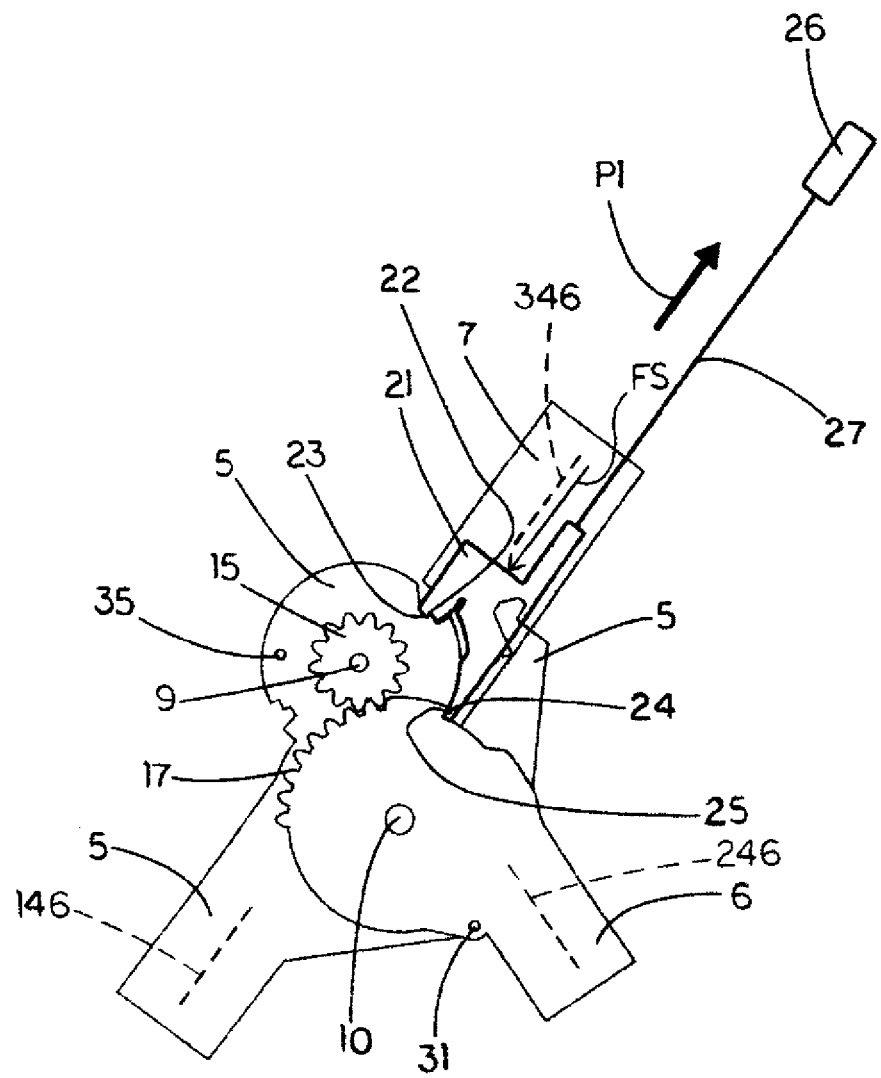
FIG. 4 is a cross section showing the function of a central part of an assembly of the stroller as shown in FIG. 1.
Figure 5A:
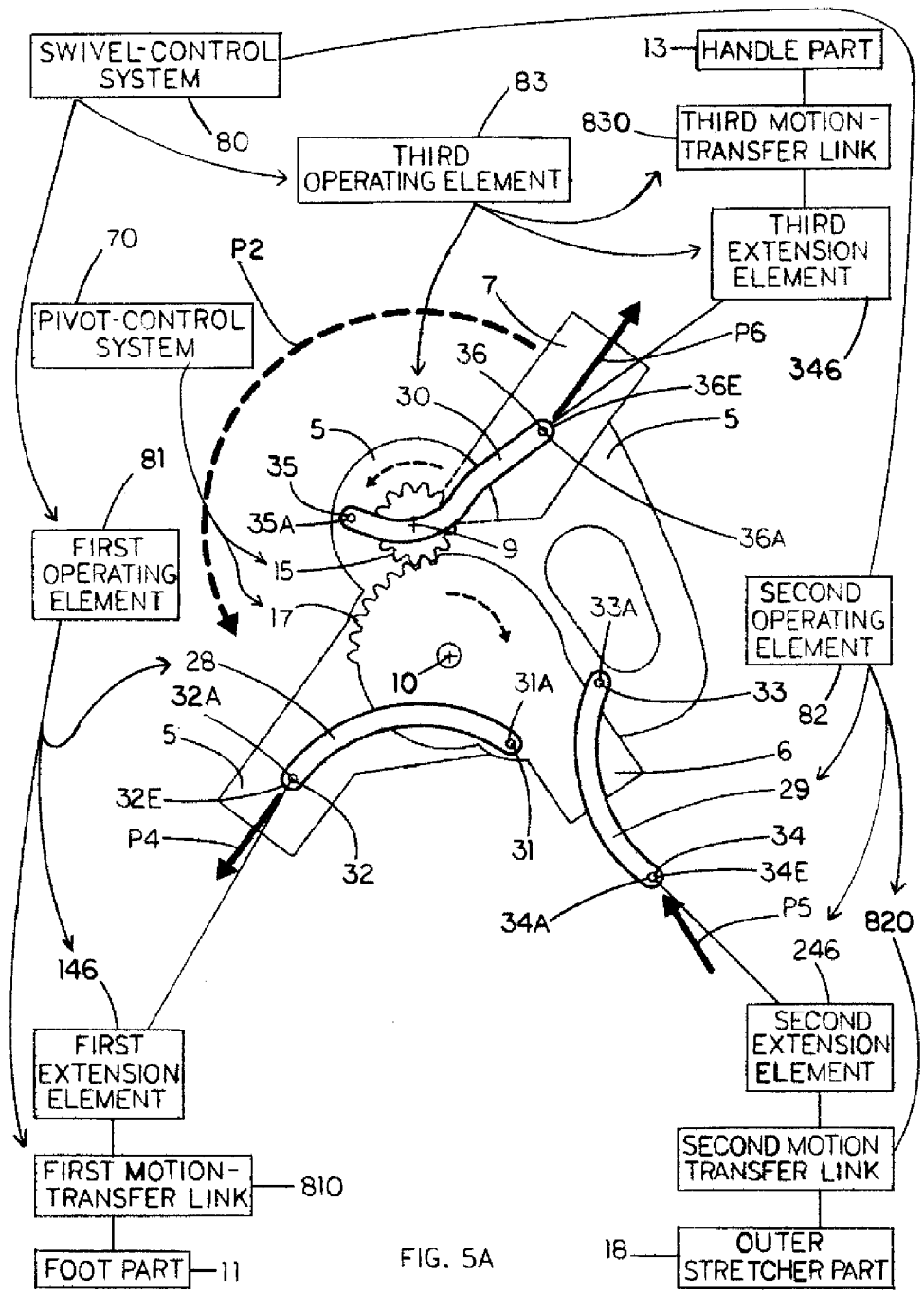
FIGS. 5A-5C are cross sections of a central part of an assembly of the stroller as shown in FIG. 1, in an unfolded position, a partly folded position, and a folded position of the stroller, respectively.
Figure 5B:
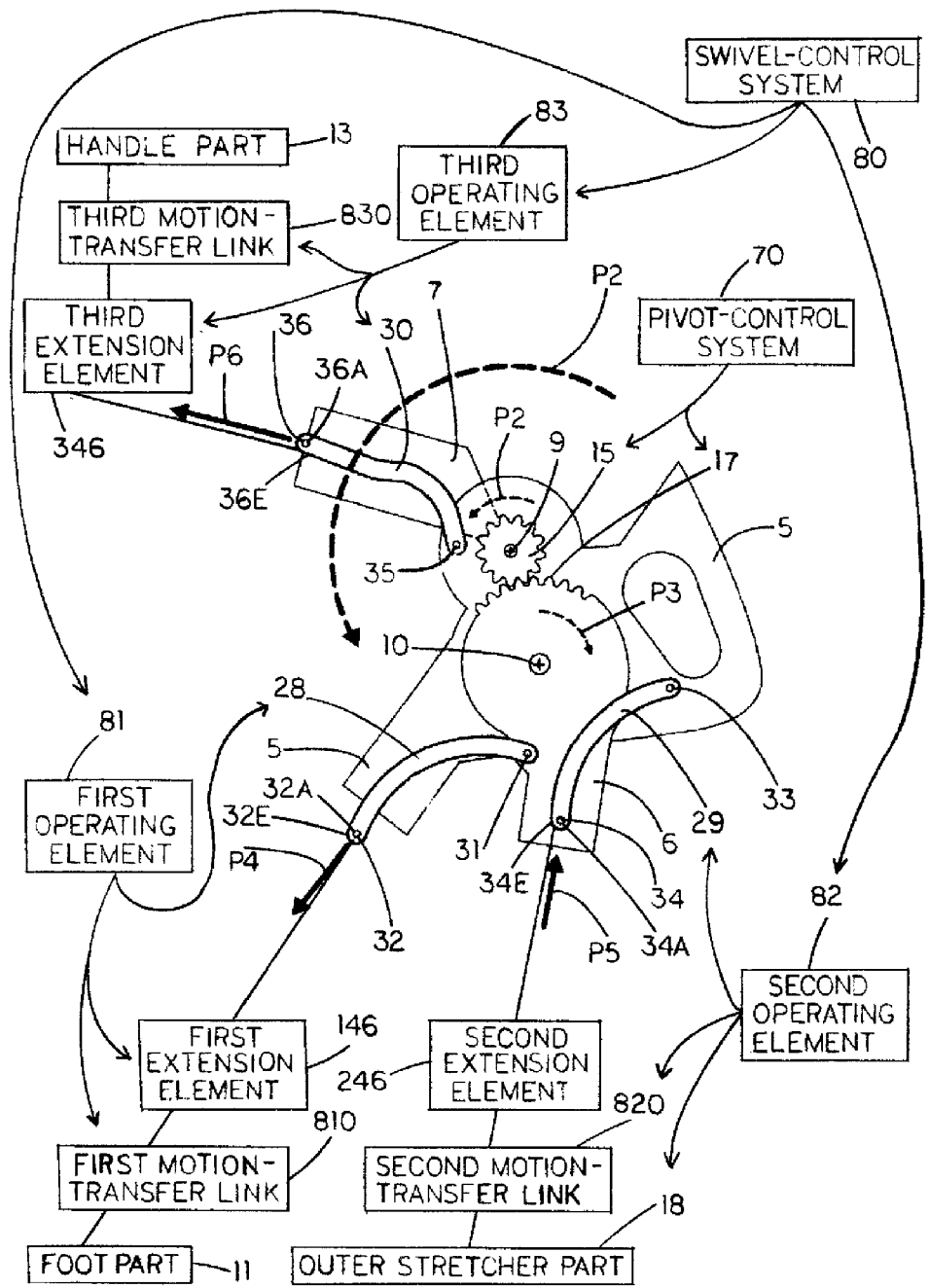
Figure 5C:
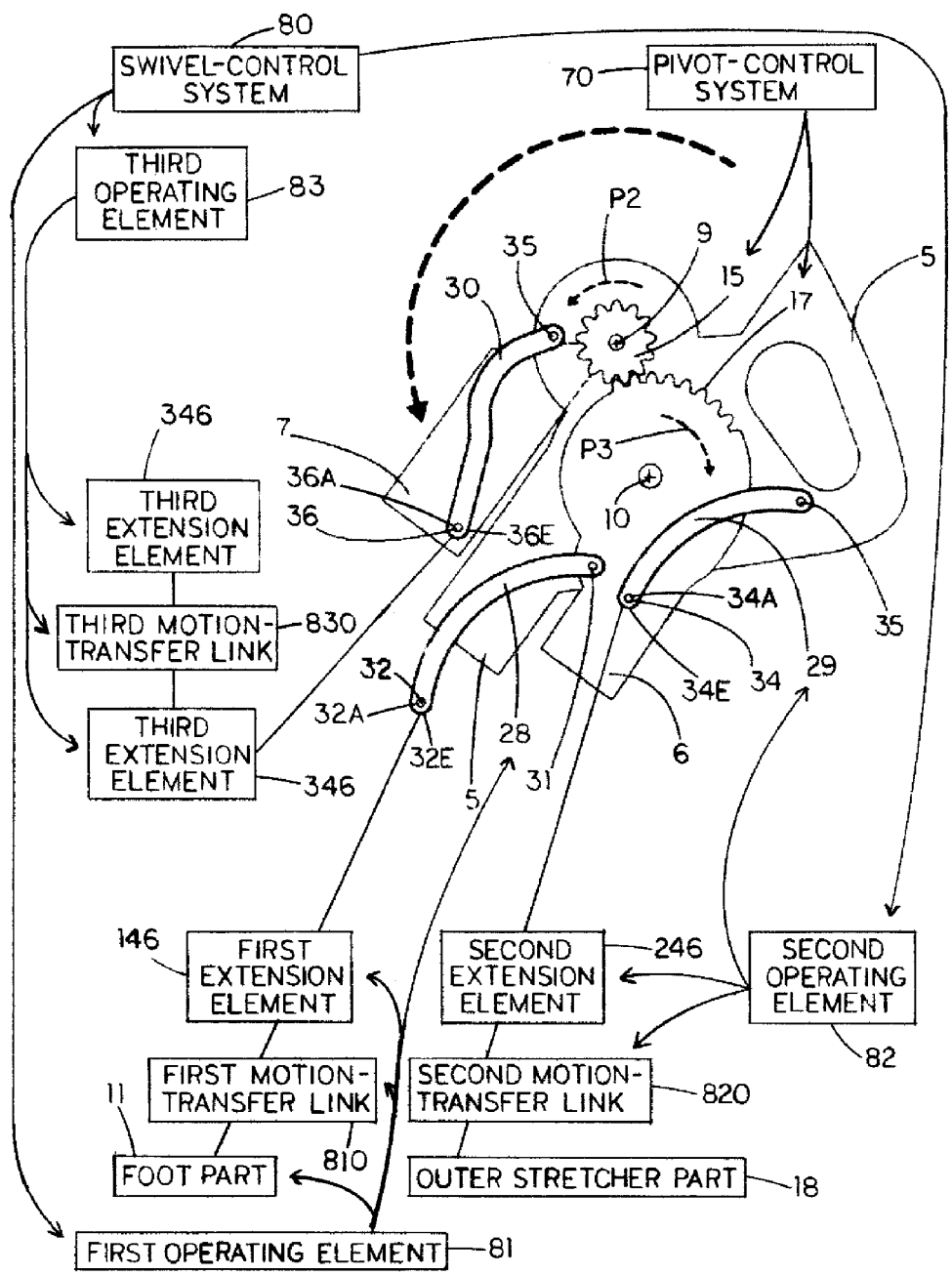

Each first (front) leg 5 is provided near a lower first end with a front wheel 8 and near an upper second end with two pivot axes 9, 10 (see FIG. 4-5C). Near the lower first ends the first legs 5 are connected to each other by means of two foot parts 11. The foot parts 11 are pivotably connected to each other about a foot pivot axis 12 as suggested in FIGS. 1-3. Each foot part 11 is swivelably connected to its corresponding first leg 5 about a swivel axis 40 as suggested in FIG. 6A.

Each push arm 7 is provided near an upper first end with a handle part 13 being pivotably connected to each other about a handle pivot axis 14 as suggested in FIG. 1. Each handle part 13 is swivelably connected to its corresponding push arm 7 about a swivel axis 140 as suggested in FIGS. 2 and 3. Each push arm 7 is provided near a lower second end with a first (arm) gear part 15 being pivotable about the first pivot axis 9 of the companion first leg 5 as suggested in FIG. 5A. The first (arm) gear part 15 comprises teeth around its whole circumference in an illustrative embodiment as suggested in FIGS. 5A-5C.

Each second (rear) leg 6 is provided near a lower first end with a rear wheel 16 and near an upper second end with a second (rear-leg) gear part 17 being pivotable about the second pivot axis 10 of the companion first leg 5 as suggested in FIG. 5A. The second (rear-leg) gear part 17 comprises teeth around a limited section of its circumference in an illustrative embodiment as suggested in FIGS. 5A-5C. The gear parts 15, 17 of the push arm 7 and the second leg 6 are in mesh with each other as suggested in FIGS. 5A-5C.

Near the lower first ends, the second legs 6 are connected to each other by means of three stretcher parts 18, 19, and 18 wherein the middle stretcher part 19 is located between two outer stretcher parts 18. Each of the outer stretcher parts 18 is pivotably connected to the middle stretcher part 19 about a pivot axis 20 to provide two spaced-apart pivot axes 20 as shown, for example, in FIG. 1. Each outer stretcher part 18 is swivelably connected to its corresponding second leg 6 about a swivel axis 140 as suggested in FIGS. 2 and 3.

Each side-frame assembly 3, 4 of foldable frame 2 is further provided with a lock 21 being slidably located in the push arm 7 as shown, for example, in FIG. 4. The lock 21 comprises a first protrusion 22 being located in an opening 23 in the first (front) leg 5 to prevent the pivoting of the push arm 7 with respect to the companion first (front) leg 5. The lock 21 comprises a second protrusion 24 being in abutment with a pivot-blocking part 25 of the second (rear) leg 6 to prevent the pivoting of the push arm 7 with respect to the companion second (rear) leg 6.

The lock 21 is movable against spring force Fs generated by any suitable spring in a direction as indicated by arrow P1 by means of a knob 26 as suggested in FIG. 4. The knob 26 is connected to the lock 21 by a cable 27. The lock 21 and cable 27 are illustratively located inside the hollow push arm 7 so that they are hidden from view, while the knob 26 extends partly outside the push arm 7 so that a user can operate the knob 26.

A swivel-control system 80 is configured to provide means for swiveling each of the foot parts 11, outer stretcher parts 18, and handle parts 13 about companion swivel axes 40, 240, 140 relative to companion first (front) legs 5, second (rear) legs 6, and push arms 7 as suggested in FIGS. 1-3 to cause the first side-frame assembly 3 and the second side-frame assembly 4 to move relative to one another to a spread-apart first position shown, for example, in FIG. 1 in which the assemblies 3, 4 are located farther apart from one another to a drawn-together second position shown, for example, in FIG. 3 in which the assemblies 3, 4 are located closer to one another in response to movement of push arms 7 in direction P2 relative to first and second legs 5, 6 as suggested in FIGS. 2 and 5A. In an illustrative embodiment, swivel-control system comprises a first operating element 81 associated with each of the first (front) legs 5 in side-frame assemblies 3, 4, a second operating element 82 associated with each of the second (rear) legs 6 in side-frame assemblies 3, 4, and a third operating element 83 associated with each of the push arms 7 in side-frame assemblies 3, 4 as suggested in FIGS. 1 and 5A. FIGS. 5A-5C show that three curved swivel-trigger rods 28, 29, 30 and that three extension elements 146, 246, 34 are included in swivel-control system 80 and cooperate to provide means for swiveling the swivelable parts 11, 18, 13 of the first leg 5, the second leg 6, and the push arm 7, respectively, as suggested in FIGS. 5A-5C and FIGS. 1-3.

First operating element 81 of swivel-control system 80 comprises a first swivel-trigger rod 28, a first-end pivot axle 31, a second-end pivot axle 32, a first extension element 146, and a first motion-transfer link 810 coupled to first extension element 146 and a companion foot part 11 as suggested in FIG. 5A. In illustrative embodiments, first motion-transfer link 810 is configured to provide means for moving a companion foot part 11 about foot pivot axis 12 relative to a neighboring foot part 11 as suggested in FIGS. 6A and 6B in response to movement of first extension element 146 relative to companion first (front) leg 5. In illustrative embodiments, first motion-transfer link 810 comprises a pin 47 coupled to first extension element 146 and a guiding element 44 coupled to a second section 42 of foot part 11 to move therewith and formed to include a slot 45 receiving pin 47 for reciprocating sliding movement therein as suggested in FIGS. 6A and 6B.

A first end of the first swivel-trigger rod 28 is pivotably connected to a pivot axle 31 coupled to second leg 6 for pivotable movement about a pivot axis 31A relative to the second leg 6 as suggested in FIGS. 5A-5C. A second end 32E of the first swivel-trigger rod 28 is connected to a first end of a first extension element 146 of the first operating element 81 using any suitable pivot coupling 32 to support first extension element 146 for pivotable movement about pivot axis 32A relative to first swivel-trigger rod 28 as suggested in FIGS. 5A-5C. First operating element 81 is connected with its other second end to the foot part 11 of the first leg 5 by means of first motion-transfer link 810 at a distance of the swivel axis 40 thereof. The first extension element 146 is located inside the hollow first leg 5 in an illustrative embodiment.

Figure 6A:
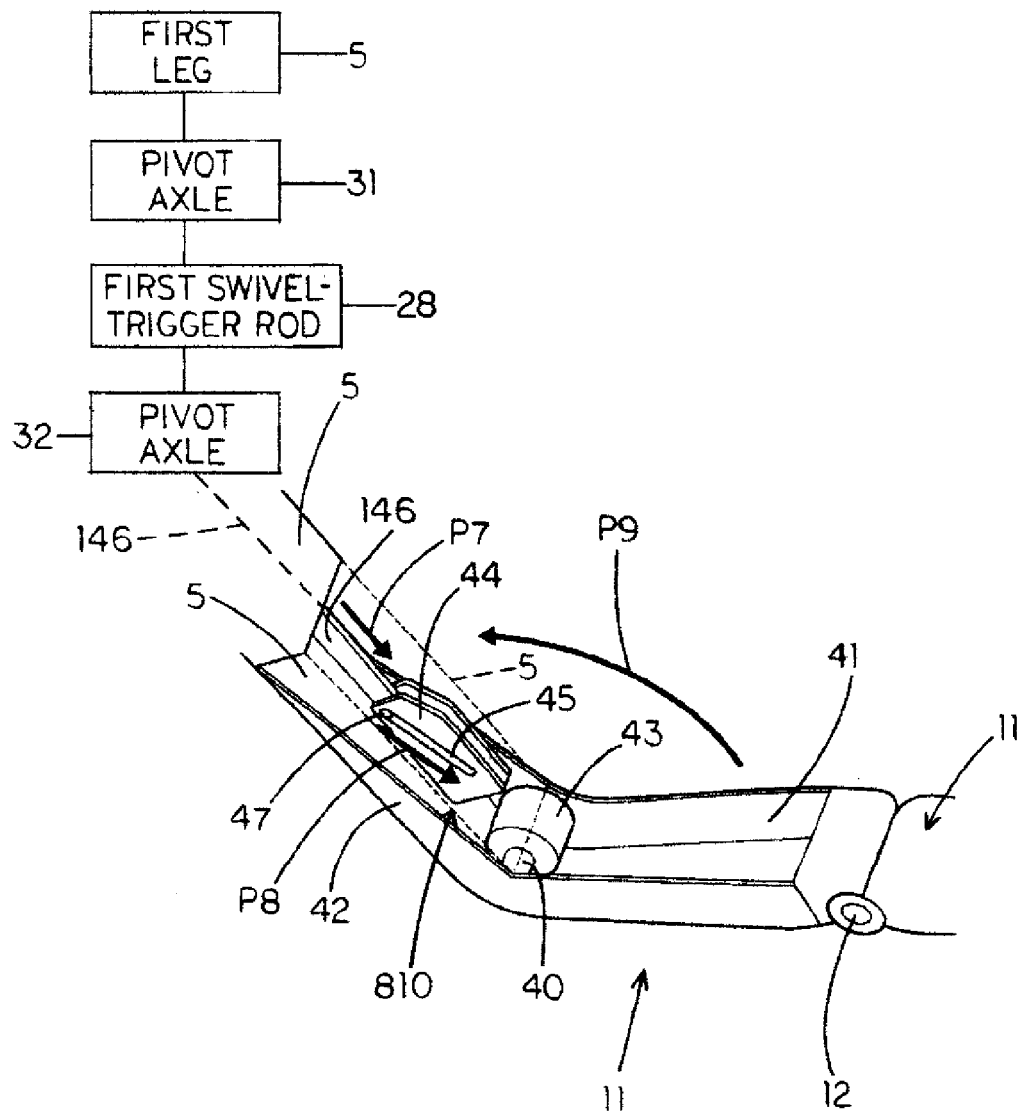
FIGS. 6A and 6B are perspective views of a first embodiment of pivotably interconnected parts in an unfolded position and a folded position of the stroller, respectively.
Figure 6B:
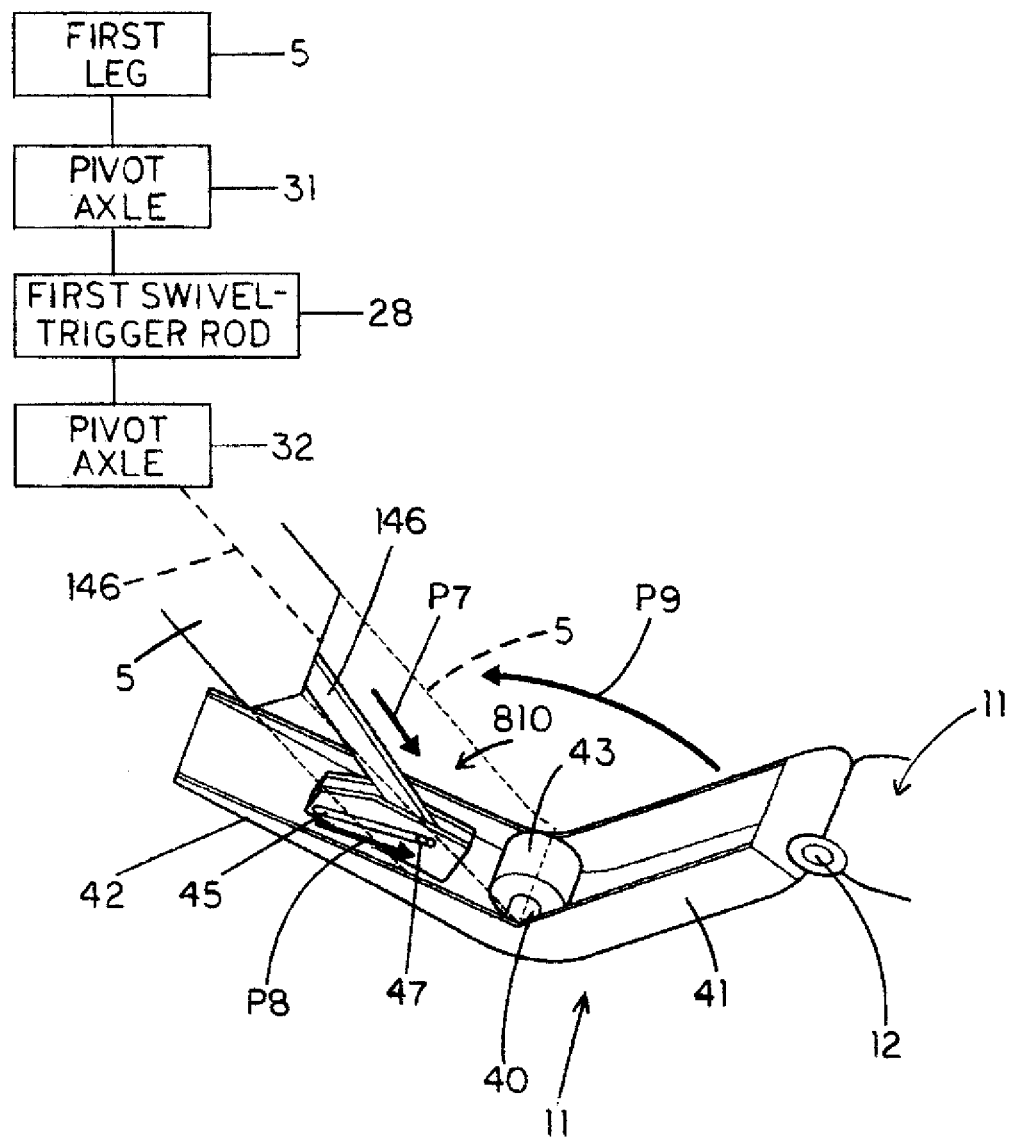

Second operating element 82 of swivel-control system 80 comprises a second swivel-trigger rod 29, a first-end pivot axle 33, a second-end pivot axle 34, a second extension element 246, and a second motion-transfer link 820 coupled to second extension element 246 and a companion outer stretcher part 18 as suggested in FIG. 5A. In illustrative embodiments, second motion-transfer link 820 is configured to provide means for moving a companion outer stretcher part 18 about a pivot axis 20 relative to a neighboring middle stretcher part 19 as suggested in FIGS. 1-3 in response to movement of second extension element 246 relative to companion second (rear) leg 6. In illustrative embodiments, second motion-transfer link 820 includes components similar to the components included in first motion-transfer link 810 as shown in FIGS. 6A and 6B.

A first end of the second swivel-trigger rod 29 is pivotably connected to a pivot axle 33 for pivotable movement about a pivot axis 33A relative to the first leg 5 as suggested in FIGS. 5A-5C. A second end 34E of the second swivel-trigger rod 29 is connected to a first end of a second extension element 246 of the second operating element 82 which is connected with its other second end to the outer stretcher part 18 of the second leg 6 by means of second motion-transfer link 820 at a distance of the swivel axis 240 thereof. The second extension element 246 is located inside the hollow second leg 6 as suggested diagrammatically in FIG. 5A.

Third operating element 83 of swivel-control system 80 comprises a third swivel-trigger rod 30, a first-end pivot axle 35, a second-end pivot axle 36, a third extension element 346, and a third motion-transfer link 830 coupled to third extension element 346 and a companion handle part 13 as suggested in FIG. 5A. In illustrative embodiments, third motion-transfer link 830 is configured to provide means for moving a companion handle part 13 about a handle pivot axis 14 relative to a neighboring handle part as suggested in FIGS. 1-3 in response to movement of the third extension element 346 relative to companion push arm 7.

A first end of the third swivel-trigger rod 30 is pivotably connected to a pivot axle 35 for pivotable movement about a pivot axis 35A relative to the first leg 5 as suggested in FIGS. 5A-5C. A second end 36E of the third swivel-trigger rod 30 is connected to a first end of a third extension element 346 which is connected with its other second end to the handle part 13 of the push arm 7 by means of third motion-transfer link 830 at a distance of the swivel axis 140 thereof. The third extension element 346 is located inside the hollow push arm 7 in an illustrative embodiment as suggested diagrammatically in FIG. 5A.

The folding of the frame 2 of the stroller 1 works as follows in an illustrative embodiment of the present disclosure. A user unlocks the locks 21 and pivots the push arms 7 about the pivot axes 9 associated with the first (front) legs 5 in the direction as indicated by arrow P2. By doing so, the first (arm) gear part 15 will force the second (rear-leg) gear part 17 to rotate in opposite direction indicated by arrow P3 until the push arms 7 and the second (rear) legs 6 are located against different sides of the first (front) legs 5 (see FIG. 5C). While pivoting the push arms 7 and second (rear) legs 6, the swivel-trigger rods 28, 29, 30 will be moved as well, wherein the second end 32E of the first swivel trigger rod 28 will be moved towards the foot part 11 in the direction as indicated by arrow P4, the second end 34E of the second swivel-trigger rod 29 will be moved away from the outer stretcher part 18 in the direction as indicated by arrow P5, and the second end 36E of the third swivel-trigger rod 30 will be moved towards the handle part 13 in the direction as indicated by arrow P6. These movements will cause the extension elements 146, 246, 346 connected to the swivel-trigger rods 28, 29, 30 to be moved accordingly and will cause the parts 11, 18, 13 to swivel about their swivel axes 40, 240, 140 as will be explained here below.

The connection between the swivel-trigger rods 28, 29, 30 and the swivelable parts 11, 18, 13, respectively, and the swiveling of the parts 11, 18, 13 can be realized in several different manners in accordance with the present disclosure. FIG. 6A-8B show two different possibilities within the scope of the present disclosure which can each be used for swiveling foot part 11, outer stretcher part 18, and/or handle part 13.

FIGS. 6A-6B and 7A-7B show an embodiment for swiveling foot part 11 about a swivel axis 40 connected to the first hollow leg 5. The foot part 11 comprises a hollow L-shaped profile with a first section 41 and a second section 42. The first section 41 is pivotably connected about the pivot axis 12 to a first section 41 of the foot part 11 of the other first leg 5. At a side away from the pivot axis 12 the first section 41 is provided with a cylinder 43 being swivelable about the swivel axis 40 of the first leg 5. The second section 42 is provided with a guiding element 44 comprising an elongated slot 45. The slot 45 extends under an angle with the longitudinal direction of the first leg 5. The first leg 5 is provided with the first extension element 146 which is pivotably connected with a first end to the second end 32 of the swivel-trigger rod 28. The second end of the first extension element 146 is provided with a pin 47. The pin 47 is slidably located in the slot 45 of the guiding element 44. In the position of the foot part 11 as shown in FIG. 6A, the pin 47 is located at the upper end of the slot 45 and the second section 42 rests against the first leg 5. The first leg 5 is partly shown with dotted lines for the sake of clarity. When the first extension element 146 is being moved in the direction as indicated by arrow P7, the pin 47 will be forced to slide in the slot 45 in the direction as indicated by arrow P8 until the pin 47 is located in the lower end of the slot 45, wherein the foot part 11 will be forced to swivel about the swivel axis 40 in the direction as indicated by arrow P9.

Preferably both side-frame assemblies 3, 4 are substantially the same in construction and function, so that also foot part 11 of the other first leg 5 will be forced to swivel. By swiveling the foot parts 11, the side-frame assemblies 3, 4 will be moved towards each other from the expanded use position shown in FIG. 1 to the retracted storage position shown in FIG. 3. A similar construction can be used for the handle parts 13.

FIGS. 8A and 8B show schematically an embodiment of two pivotably interconnected outer stretcher parts 18, wherein the outer stretcher part 18 is swivelably connected to the second hollow leg 5 about a swivel axis 240. The second (rear) leg 6 is provided a second operating element comprising the second swivel-trigger rod 29, a second extension element 246, and a coupling rod 52. The second extension element 246 is pivotably connected with a first end to the second end 34E of the second swivel-trigger rod 29. The second end of the second extension element 246 is pivotably connected about a pivot axis 53 to the coupling rod 52. The coupling rod 52 is pivotably connected about pivot axis 54 to the outer stretcher part 18. The pivot axis 54 is located between the swivel axis 240 and the pivot axis 20 (see FIG. 1). When folding the frame 2 of the stroller 1, the second end 34E of the second swivel-trigger rod 29 will be moved in a direction as indicated by arrow P5 causing the second extension element 246 to be moved in the direction as indicated by arrow P10. Due to this movement, coupling rod 52 will force the outer stretcher part 18 to swivel about the swivel axis 240 on the second (rear) leg 6.

Figure 9:
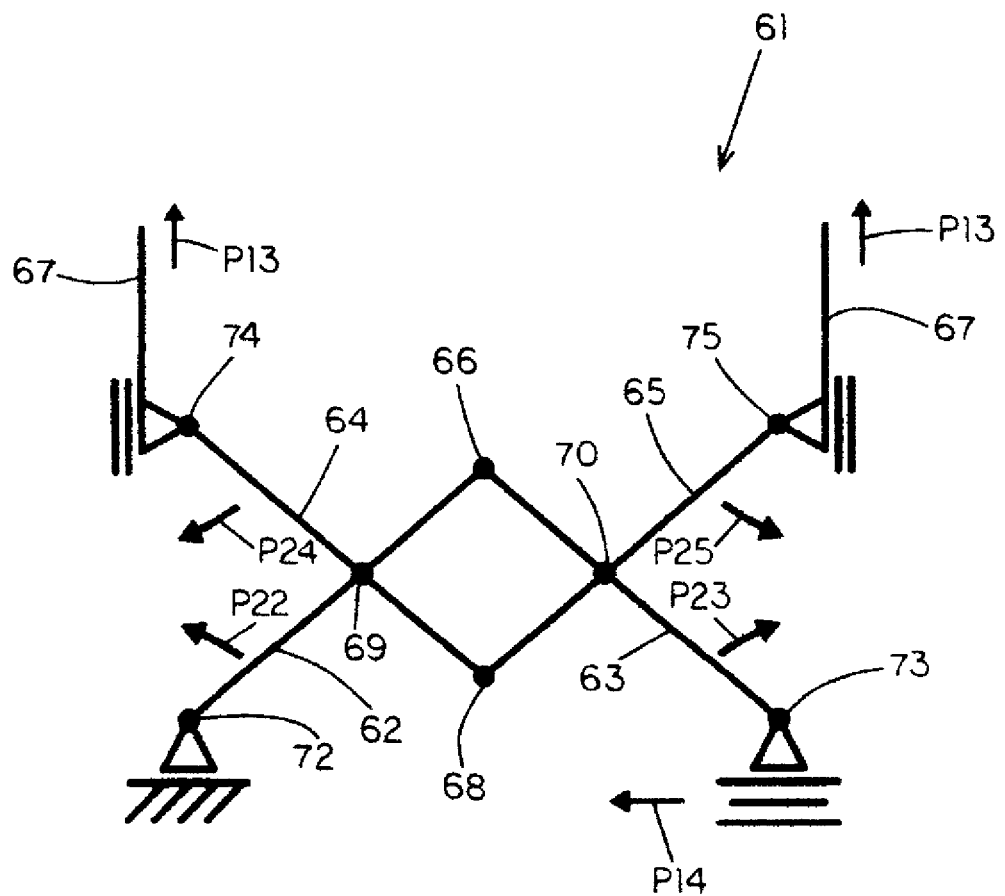

FIG. 9 shows schematically a framework 61 of pivotably interconnected parts 62, 63, 64, 65, which framework 61 can be located between a pair of legs and/or a pair of push arms. The framework 61 will be explained as if connected between the rear second legs 6. The parts 62, 63, 64, 65 are made of rods. Part 62 is swivelably connected near an end of the second leg 6 at swivel axis 72 while part 63 is swivelably connected near an end of the other second leg 6 at swivel axis 73. The parts 62, 63 are pivotably connected to each other at their other ends at pivot axis 66. Part 64 is swivelably connected to an end of a rod-like operating element 67 at swivel axis 74 while part 65 is swivelably connected to an end of another rod-like operating element 67 at swivel axis 75. The operating elements 67 are located in the second legs 6. The parts 64, 65 are pivotably connected to each other at their other ends at pivot axis 68.

Furthermore, the parts 62, 64 and the parts 63, 65 are pivotably connected to each other between the swivel axes 72, 73, 74, 75 and the respective pivot axis 66, 68 at pivot axis 69, 70 respectively.

When folding the stroller, the operating elements 67 will be moved in the direction as indicated by the arrow P13, due to which the swivel axes 72, 74 and 73, 75 will be moved apart and the parts 62, 63, 64, 65 will be swiveled in the direction as indicated by arrows P22, P23, P24, P25. As a result the swivel axes 73, 75 will be moved towards the swivel axes 72, 74 in the direction as indicated by arrow P14 and the second legs will be moved towards each other.

In case that the extension element is a rigid rod, the operating element is suitable for exerting a pulling force and a pushing force on the swivelable part and will cause the swivelable part to swivel both during folding and unfolding of the frame. In case that the operating element comprises a flexible bendable element, for example a cable, the operating element is more suitable for only exerting a pulling force on the part to cause the swivelable part to swivel during folding or unfolding of the frame. In such a case, the operating element may also comprise a spring to cause a pushing force for swiveling the part in the opposite direction.

As desired, the frame 2 may comprises handles 60 on the first legs 5 for lifting the folded stroller 1.

It is also possible within the scope of the present disclosure to provide other pivotably interconnected parts between the legs or the arms to move the side-frame assemblies 3, 4 towards each other.

It is also possible within the scope of the present disclosure to have the pivotably interconnected parts only between one pair of legs, only between the pair of push arms, only between the two pair of legs or only between one pair of legs and the pair of push arms.

It is also possible within the scope of the present disclosure to have the pivotably interconnected parts located closer to the pivot axes 9, 10, for example near the middle of the legs and push arms.

It is also possible within the scope of the present disclosure to provide the slots 45 or similar slots with at least two parts including an angle of less than 180 degrees with each other. The first part extends in the longitudinal direction of the leg or push arm. During a first movement of the pin 47 in the first part of the slot 45 no swiveling of the foot part 11 will occur. The foot part 11 will only start swiveling as soon as the pin 47 is being moved through the second part of the slot. In this manner it is for example possible to delay the start of the swiveling of the parts between one pair of legs with respect to the start of the swiveling of parts between the other pair of legs to optimize the folding of the stroller.

It is also possible within the scope of the present disclosure to provide the slots 45 or similar slots with a small recess from which the pin 47 can only be removed when a certain predetermined pulling or pushing force is applied. In this manner the recess functions as an additional lock and prevents inadvertently folding of the stroller. The first legs can also be the rear legs, in which case by folding the stroller the rear legs will become located between the arms and the front legs.

The seat of the stroller may be detached from the stroller before folding the stroller or may be folded together with the stroller.

The width of a stroller in accordance with the present disclosure in its folded position is substantially reduced with respect to the width of the stroller in its unfolded position. At least a pair of legs or a pair of push arms of the side-frame assemblies are connected to each other near ends avert of the pivot axes by means of at least two interconnected parts being pivotable about at least one pivot axis, each part being swivelable about a swivel axis near the end avert of the pivot axes, wherein at least one part of a leg is connected to the other leg or push arm of the same assembly, while at least one part of a push arm is connected to one of the legs of the same side-frame assembly by means of at least one operating element for swivelling at least one part with respect to the corresponding leg or push arm, wherein by pivoting the push arm and second leg with respect to the first leg from an unfolded position to a folded position, the at least one operating element is being moved, whereby the parts are being swivelled from a first position in which the side-frame assemblies are spaced apart to a second position in which the side-frame assemblies are located closer to each other, and vice versa.

Due to the pivotably interconnected parts, the two side-frame assemblies can be moved towards each other when folding the frame to the folded position. By moving the side-frame assemblies towards each other the width of the folded stroller is substantially reduced. Since the operating element is connected to the swivelable part of one leg as well as to the push arm or the other leg of the same side-frame assembly or is connected to the swivelable part of the push arm as well as to one of the legs of the same side-frame assembly, the operating element will force the swivelable part to swivel automatically when the side-frame assembly is being folded. A user simply has to pivot the push arms with respect to the first legs, wherein automatically the second legs are also moved towards the first legs and the side-frame assemblies are being moved towards each other. The first legs will be located between the second legs and the push arms, the wheels connected to the four legs will be located close to each other and also the handle parts will be located close to each other. So a very compact folded stroller is obtained.

A stroller in accordance with the present disclosure is characterized in that the parts are swivelable about swivel axes of the second legs, wherein the operating element is connected with its second end to the first leg. By locating the swivelable parts between swivel axis located near ends of the second legs, which ends are located avert of the pivot axes, the swivelable parts will cause the seconds legs to move towards each other when folding the frame. The other legs and push arms will follow this movement.

Another embodiment of a stroller in accordance with the present disclosure is characterized in that the parts are swivelable about swivel axes of the first legs, wherein the operating element is connected with its second end to the second leg. By locating the swivelable parts between swivel axis located near ends of the first legs, which ends are located avert of the pivot axes, the swivelable parts will cause the first legs to move towards each other when folding the frame. The other legs and push arms will follow this movement. When swivelable parts are located between the first legs as well as between the second legs, the side-frame assemblies can be moved easily towards and away from each other.

In case that the operating element comprises only rigid elements, the operating element is suitable for exerting a pulling force and a pushing force on the swivelable part and will cause the swivelable part to swivel both during folding and unfolding of the frame. In case that the operating element comprises a flexible bendable element, the operating element is more suitable for only exerting a pulling force on the part to cause the swivelable part to swivel during folding or unfolding of the frame.

A further embodiment of the stroller in accordance with the present disclosure is characterized in that the handle parts of the push arms are swivelable about the swivel axes of the arm, wherein the operating element is connected with its second end to the first leg. By using the pivotably connected handle parts as the two pivotably interconnected parts, the swivelling of the handle parts will cause the push arms to move towards each other when folding the frame. The other legs will follow this movement, especially when also the first legs and/or second legs are also connected to each other near ends avert of the pivot axes by means of at least two pivotably interconnected parts.

A further embodiment of the stroller in accordance with the present disclosure is characterized in that the side-frame assemblies are connected to each other near ends avert of the pivot axes of the pair of arms, near ends away from the pivot axes of the pair of first legs and near ends away from the pivot axes of the pair of second legs, by means of at least two pivotably interconnected parts extending between the first ends of the push arms, the first legs, and the second legs, respectively. In this manner the movement of the side-frame assemblies towards each other is very well controlled. The unfolded stroller will be very stable due to the interconnected parts located near the ends of the first legs, the ends of the second legs, and the ends of the push arms. Furthermore, the whole space between the side-frame assemblies is available for mounting a seat, a basket, or other elements. A further embodiment of the stroller in accordance with the present disclosure is characterized in that the pivotably interconnected parts are connected to each other by means of at least an intermediate part. Due to the intermediate part which is illustratively pivotably connected to the parts, any desired movement of the side-frame assemblies towards each other can be obtained.

A further embodiment of the stroller according to the present disclosure characterized in that the operating element comprises at least a swivel-trigger rod being pivotably connected to the leg or the push arm and pivotably connected to an extension member located between the swivel-trigger rod and the swivelable part. Due to the rod, which might be curved to easily fit in the legs and push arms, it is possible to connect the operating element to any desired location in or on the legs or push arms.

A further embodiment of the stroller according to the present disclosure is characterized in that the operating member or the swivelable part comprises a pin being slidable in a slot of the swivelable part or operating member respectively for swivelling the part about the swivel axis. Such a pin-slot construction renders it relatively easily to convert a linear movement into a rotational movement.

A further embodiment of the stroller according to the present disclosure is characterized in that the frame comprises locking means for locking the gear parts against rotation. Such locking means will easily prevent the frame against being folded unintentionally.

The invention claimed is:

1. A stroller comprising at least a foldable frame being provided with at least a first and a second side-frame assembly of at least a first leg, a second leg, and a push arm provided with a handle part, wherein in each assembly, the push arm is provided with a first gear part being pivotable about a first pivot axis of the first leg, the second leg is provided with a second gear part being pivotable about a second pivot axis of the first leg, wherein the gear parts of the push arm and the second leg are in mesh with each other, characterized in that at least a pair of legs or a pair of push arms of the side-frame assemblies are connected to each other near ends away from the pivot axes by means of at least two pivotably interconnected parts, each part being swivelable about a swivel axis near the end, wherein at least one operating element for swivelling at least one part with respect to the corresponding leg or push arm is connected with a first end to the part and with a second end to the other leg or push arm of the same side-frame assembly, wherein by pivoting the push arm and second leg with respect to the first leg from an unfolded position to a folded position, the parts are being swivelled from a first position in which the side-frame assemblies are spaced apart to a second position in which the side-frame assemblies are located closer to each other, and vice versa.

2. A stroller according to claim 1, characterized in that the parts are swivelable about swivel axes of the first legs, wherein a first of the operating elements is connected with its second end to the second leg.

3. A stroller according to claim 2, characterized in that the parts are swivelable about swivel axes of the first legs, wherein a first of the operating elements is connected with its second end to the second leg.

4. A stroller according to claim 1, characterized in that the parts are swivelable about swivel axes of the second legs, wherein a second of the operating elements is connected with its second end to the first leg.

5. A stroller according to claim 4, characterized in that the handle parts of the arms are swivelable about the swivel axes of the push arm, wherein a third of the operating elements is connected with its second end to the first leg.

6. A stroller according to claim 1, characterized in that the handle parts of the arms are swivelable about the swivel axes of the push arm, wherein a third of the operating elements is connected with its second end to the first leg.

7. A stroller according to claim 1, characterized in that the assemblies are connected to each other near ends away from the pivot axes of the pair of push arms, near ends away from the pivot axes of the pair of first legs and near ends away from the pivot axes of the pair of second legs, by means of at least two pivotably interconnected parts extending between the first ends of the push arms, the first legs, and the second legs, respectively.

8. A stroller according to claim 7, characterized in that the pivotably interconnected parts are connected to each other by means of at least an intermediate part.

9. A stroller according to claim 1, characterized in that each operating element comprises at least a rod being pivotably connected to the leg or the push arm and pivotably connected to an extension member located between the rod and the swivelable part.

10. A stroller according to claim 1, characterized in that each operating member or the swivelable part comprises a pin being slidable in a slot of the swivelable part or operating member, respectively, for swivelling the part about the swivel axis.

11. A stroller according to claim 1, characterized in that the frame comprises locking means for locking the gear parts against rotation.

12. A stroller comprising at least a foldable frame being provided with at least a first and a second side-frame assembly of at least a front leg provided with a foot part, a rear leg provided with an outer stretcher part, and a push arm provided with a handle part, wherein in each assembly, the push arm is provided with a first gear part being pivotable about a first pivot axis of the front leg, the second leg is provided with a second gear part being pivotable about a second pivot axis of the front leg, wherein the gear parts of the push arm and the second leg are in mesh with each other, and further comprising a swivel-control system configured to provide means for swivelling each of the foot parts, outer stretcher parts, and handle parts about companion swivel axes relative to companion front legs, rear legs, and push arms to cause the first side-frame assembly and the second side-frame assembly to move relative to one another to a drawn-together position in which the first and second side-frame assemblies are located closer to one another to a spread-apart position in which the first and second side-frame assemblies are located further apart from one another in response to pivoting movement of the push arms relative to the front and rear legs.

13. A stroller comprising
a foldable frame including first and second side-frame assemblies, each side-frame assembly including a front leg, a rear leg mounted for pivotable movement relative to the front leg about a rear-leg pivot axis, a push arm mounted for pivotable movement relative to the front leg about an arm pivot axis, a foot part coupled for swivelling movement at a swivel axis to a lower end of the front leg associated therewith, an outer stretcher part coupled for swivelling movement at a swivel axis to a lower end of the rear leg associated therewith and a handle part coupled for swivelling movement at a swivel axis to an upper end of the push arm associated therewith, wherein the foot parts are pivotably coupled to each other about a foot pivot axis, each of the outer stretcher parts is pivotably coupled to a middle stretcher part included in the stroller and interposed between the outer stretcher parts about a stretcher pivot axis, and the handle parts are pivotably coupled to each other about a handle pivot axis,
wheels including a front wheel associated with a lower portion of the front leg and a rear wheel associated with a lower portion of the rear leg,
a pivot-control system including an arm gear coupled to the push arm and mounted to rotate about the arm pivot axis associated with the front leg during pivoting movement of the push arm relative to the front leg about the arm pivot axis and a rear-leg gear coupled to the rear leg and mounted to rotate about the rear-leg pivot axis associated with the front leg and to mesh with the arm gear to cause pivoting movement of the rear leg relative to the front leg about the rear-leg pivot axis in response to pivoting movement of the push arm relative to the front leg about the arm pivot axis, wherein the arm and rear-leg gears are arranged to lie in predetermined positions on the foldable frame to cause the rear leg to pivot about the rear-leg pivot axis toward the front leg to establish a collapsed storage configuration of the stroller in response to pivoting movement of the push arm about the arm pivot axis toward the front leg and to cause the rear leg to pivot about the rear-leg pivot axis away from the front leg to establish an expanded use configuration of the stroller in response to pivoting movement of the push arm about the arm pivot axis away from the front leg, and
a swivel-control system configured to provide means for swivelling each of the foot parts about the foot pivot axis, each of the outer stretcher parts about a companion stretcher pivot axis relative to the middle stretcher part, and each handle part about the handle pivot axis to cause the first side-frame assembly and the second side-frame assembly to move relative to one another to a drawn-together position in which the first and second side-frame assemblies are located closer to one another to a spread-apart position in which the first and second side-frame assemblies are located farther apart from one another in response to pivoting movement of the push arms relative to the front and rear legs.

14. The stroller of claim 13, wherein the swivel-control system comprises a first operating element associated with one of the front legs and the first operating element comprises a first swivel-trigger rod, a first-end pivot axle, a second-end pivot axle, a first extension element, and a first motion-transfer link coupled to the first extension element and a companion foot part and configured to provide means for moving the companion foot part about the foot pivot axis relative to a neighboring foot part in response to movement of the first extension element relative to the companion front leg.

15. The stroller of claim 14, wherein the first motion-transfer link includes a pin coupled to the first extension element and a guiding element coupled to a second section of the foot part to move therewith and formed to include a slot configured to provide means for receiving the pin for reciprocating sliding movement therein.

16. The stroller of claim 14, wherein a first end of the first swivel-trigger rod is pivotably connected to the first-end pivot axle that is coupled to a rear leg for pivotable movement about a companion pivot axis about a first pivot axle relative to the rear leg and a second end of the first swivel-trigger rod is connected via the second end pivot axle to a first end of the first extension element to support the first extension element for pivotable movement about a second companion pivot axis relative to the first swivel-trigger rod.

17. The stroller of claim 16, wherein the first operating element has a second end connected to the foot part of the front leg by the first motion-transfer link at a distance from the swivel axis thereof.

18. The stroller of claim 16, wherein the first extension element is located inside an interior chamber formed in the first leg.

19. The stroller of claim 13, wherein the swivel-control system comprises a second operating element associated with one of the rear legs and the second operating element comprises a second swivel-trigger rod, a first-end pivot axle, a second-end pivot axle, a second extension element, and a second motion-transfer link coupled to the second extension element and a companion outer stretcher part and configured to provide means for moving the companion outer stretcher part about a pivot axis relative to the middle stretcher part in response to movement of the second extension element relative to the companion rear leg.

20. The stroller of claim 19, wherein a first end of the second swivel-trigger rod is pivotably connected to the first-end pivot axle for pivotable movement about a companion pivot axis relative to the front leg and a second end of the second swivel-trigger rod is connected via the second-end pivot axle to a first end of the second extension element to support the second extension element for pivotable movement about a companion pivot axis relative to the second swivel-trigger rod.

21. The stroller of claim 20, wherein the second operating element has a second end connected to the outer stretcher part of the second leg by the second motion-transfer link at a distance of the swivel axis thereof.

22. The stroller of claim 20, wherein the second extension element is located inside an interior chamber formed in the rear leg.

23. The stroller of claim 13, wherein the swivel-control system comprises a third operating element associated with the push arm and the third operating element comprises a third swivel-trigger rod, a first-end pivot axle, a second-end pivot axle, a third extension element, and a third motion-transfer link coupled to the third extension element and to a companion handle part and configured to provide means for moving the companion handle part about a handle pivot axis relative to a neighboring handle part in response to movement of the third extension element relative to the companion push arm.

24. The stroller of claim 23, wherein a first end of the third swivel-trigger rod is pivotably connected to the first-end pivot axle for pivotable movement about a companion pivot axis relative to the front leg and a second end of the third swivel-trigger rod is connected via the second-end pivot axle to a first end of the third extension element to support the third extension element for pivotable movement about a companion pivot axis relative to the third swivel-trigger rod.

25. The stroller of claim 24, wherein the third operating element has a second end connected to the handle part of the push arm by the third motion-transfer link at a distance from the swivel axis thereof.

26. The stroller of claim 24, wherein the third extension element is located inside an interior chamber formed in the push arm.

* * * * *